United States Patent Office 2,975,518
Patented Mar. 21, 1961

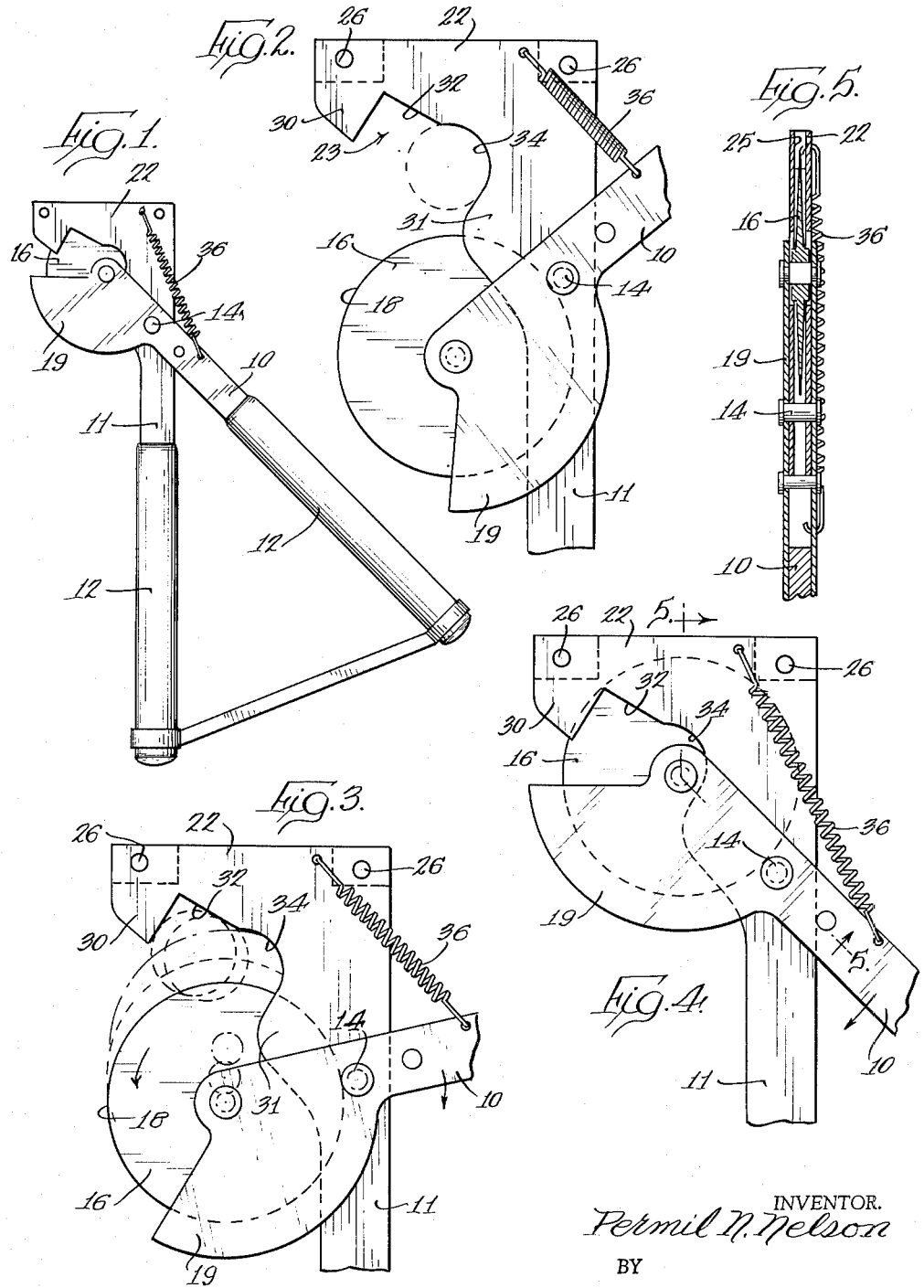

2,975,518
CUTTING TOOL
Permil N. Nelson, Galesburg, Ill., assignor to Lynn H. Ewing, doing business as Black Hawk Company, Rock Island, Ill.

Filed June 7, 1957, Ser. No. 664,212

1 Claim. (Cl. 30—263)

The present invention pertains to an improved cutting tool which finds particular use for trimming tree and shrub branches, limbs or the like.

For trimming trees, shrubs, and the like, there is a need for a cutting tool which not only will clip or shear the smaller twig branches, but also will cut branches which are somewhat thicker and would ordinarily require the use of shears of a larger size than can be conveniently handled. In the latter case, it becomes necessary to resort to a saw, which in many instances is difficult to use, particularly in the case where many trunks, branches or limbs are close together. In such a case, the branches adjoining the one to be cut would be damaged by the saw.

It is the general object of the present invention to provide a novel cutting tool of the above character which is capable of being operated manually to produce a clean cut easily with a minimum of effort and without damaging the portion of the branch adjacent the cut.

Another object of the present invention is to facilitate the cutting of relatively thick branches and the like with a cutting tool which is easily manipulated and which requires a minimum of clearance when cutting such thick branches thereby avoiding the damaging of adjacent branches.

Another object is to provide a novel cutting tool which is simple yet rugged and which retains a sharp cutting edge after a long period of use.

Other objects and advantages will become apparent as the following description proceeds taken in connection with the accompanying drawing wherein.

Figure 1 is a plan view of a cutting tool illustrative of the present invention.

Fig. 2 is an enlarged fragmentary plan view of the cutting tool showing the parts in position for receiving a limb to be cut.

Fig. 3 is a view similar to Fig. 2, but showing successive stages of a cutting action on the limb.

Fig. 4 is a view similar to Fig. 2 but showing the cutter element in closed position after the limb is severed.

Fig. 5 is a section view through the illustrative tool taken substantially in the plane of line 5—5 of Fig. 4.

Although an illustrative cutting device has been shown in the drawings and will be described below in considerable detail it should be understood that there is no intention to limit the invention to the specific form disclosed but on the contrary the intention is to cover all modifications, alternatives, equivalents and uses falling within the spirit and scope of the invention as expressed in the appended claims.

Referring now to the drawings the cutting tool there shown comprises a pair of arms 10, 11 pivoted together intermediate their ends for relative swinging movement. Handles 12 are provided on corresponding ends of the arms 10, 11, which handles may be grasped in the hands of the user and moved together and apart in order to operate the cutter in scissors-like fashion. For pivoting the arms together, one of the arms 10 is provided with a bifurcated or forked end portion opposite its handle end. The other arm 11 is received in this forked end portion and a shoulder bolt 14 on which the other arm 11 is pivotally mounted extends between the forks and is secured to the forked end portion. It is desirable, of course, that the shoulder bolt pivot be as close to the ends of the arms opposite the handles as is possible in order to provide for an effective multiplication of the force applied to the handles and exerted by the cutter elements.

The cutter elements include a cutter blade 16 rotatably mounted between the forked end portions of the arm 10 also by means of a suitable shoulder bolt. The blade itself is generally circular and is provided with a circumferential cutting edge 18. The blade 16 being mounted for rotary movement in the forked end of the arm 10 thus presents an edge 18 to perform the cutting operation. It can be seen that as this edge cuts into the limb or branch to be severed, the blade will rotate to exert a drawing or knife-like cutting action on the limb. Further, this rotary mounting prevents the blade from wearing at one spot. Rather, the wear has been found to be uniformly distributed over the circumference of the blade.

For purposes of protecting the user from the sharp edge of the cutting blade 16, the forked portions of the arm 10 extend outwardly in the form of a sector around a portion of the exposed edge of the cutter blade. A shield 19 is thus provided on each side of the blade around a portion of its circumference.

For holding an article such as a limb or branch to be cut, the cutter elements further include a supporting member 22 on the end of the second arm 11 opposite from the handle. This member comprises a generally U-shaped member extending from the arm 11 and having a squared notch 23 in a remote corner for receiving the article to be cut.

The supporting member 22 defines a longitudinal groove or slot 25 (Fig. 5) the purpose of which is to receive the cutting blade 16 as the handles are moved together to bring the cutting blade 16 into cutting relation with the supporting member 22. The slot 25 can be provided either by cutting a slot in the supporting member 22 or by forming the supporting member of a pair of plates held in spaced relation by bushings and rivets 26 as shown in the drawing.

The limb receiving notch or aperture 23 in the supporting member 22 is defined by a pair of spaced extending leg portions 30, 31 of the supporting member. For securing the member 22 to the arm 11, one of the leg portions 31 is either formed integrally with the arm or is suitably secured thereto. When the member is so mounted, the other leg 30 and the limb receiving notch extend generally toward the cutter blade 16. Connecting these legs is a web portion defining a supporting edge surface 32 against which the article to be cut is supported. The blade receiving slot 25 extends from this edge and thus splits the supporting surface 32. At the end portion of the supporting surface 32 nearest the arm pivot 14 the surface is provided with a shallow, rounded notched portion 34. The purpose of these notched portions is to receive and retain the article to be cut during the preliminary cutting action of the blade 16 (Fig. 2). As the handles are moved together (Fig. 3) and the blade 16 cuts into the article and as the cutting force increases, the article will be forced out of the shallow notch 34 in the surface 32 and will slide along the supporting member edge 32 until it abuts the forward leg 30 (Fig. 3). During this sliding movement the cutting blade 16 is rotating and cutting deeper into the limb.

Some momentum is also gained by the blade as the article being cut slides along the cutting surface 32. When the article is suddenly stopped by the upstanding leg 30, the momentum of the cutting blade aids in completing the cutting operation so that the blade slices cleanly through the limb or branch.

To assist in separating the supporting member 22 and the cutting blade 16 when the cutting operation is completed, a suitable spring 36 is provided for biasing the handles apart and thus biasing the cutting blade and supporting member to the open position.

I have found that the above described tool can easily sever limbs as thick as 1½ inches in diameter. By holding the limb to be cut in the shallow depression in order to make an initial cut and by providing for rotation of the cutting blade as the limb is forced against the leg 30, a cleaner cut is achieved, and the effort required on the part of the user even when cutting thick branches or limbs is reduced.

It should be understood that my invention is not to be limited to the use of two handles, but one of the handles 11 may comprise a pole and the other arm 10 may be operated by a chain or cord to swing the cutting blade.

A cutting tool which is easily operated, yet extremely effective for relatively thick large-sized limbs or branches, has thus been described. The tool is economical to manufacture and has been found to be satisfactory in operation.

I claim as my invention.

In a cutter for cutting tree limbs, the combination comprising a first elongated arm, a circular blade mounted on a first pivot positioned at the upper end of said arm and having a peripheral cutting edge, a second elongated arm, a second pivot remotely mounted from the upper ends of said arms for connecting said arms together, said second arm having a slot near said upper end to receive said circular blade therebetween, the sides of said slot formed of parallel walls having a squared notch in a remote corner therein, said square notch defined by a pair of extending leg portions connected by a web portion, one of the extending leg portions being at the end of the second arm and the other extending leg portion being spaced from and above the second pivot so that said notch retains a tree limb while said circular blade is being forced therethrough as the extended ends of said arms are moved together about said second pivot.

References Cited in the file of this patent

UNITED STATES PATENTS

| | | |
|---|---|---|
| 47,250 | Carter | Apr. 11, 1865 |
| 61,806 | Clinton et al. | Feb. 5, 1867 |
| 68,280 | Binder | Aug. 27, 1867 |
| 141,273 | Hills | July 29, 1873 |
| 205,103 | Knowles | June 18, 1878 |
| 564,102 | Richard | July 14, 1896 |
| 660,195 | Manly | Oct. 23, 1900 |
| 734,304 | Crecelius | July 21, 1903 |
| 785,225 | Manly | Mar. 21, 1905 |
| 1,091,607 | Weaver | Mar. 31, 1914 |